(12) United States Patent
Aukzemas et al.

(10) Patent No.: US 7,278,809 B2
(45) Date of Patent: Oct. 9, 2007

(54) TELESCOPIC CAPTIVE FASTENER

(75) Inventors: Thomas V. Aukzemas, Wilmington, DE (US); Edward A. McCormack, Chadds Ford, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 11/559,428

(22) Filed: Nov. 14, 2006

(65) Prior Publication Data

US 2007/0071574 A1    Mar. 29, 2007

Related U.S. Application Data

(62) Division of application No. 10/738,070, filed on Dec. 17, 2003, now Pat. No. 7,179,037.

(60) Provisional application No. 60/434,497, filed on Dec. 18, 2002.

(51) Int. Cl.
    *F16B 37/08*    (2006.01)
    *F16B 37/12*    (2006.01)

(52) U.S. Cl. .................. 411/432; 411/433; 411/353; 411/108; 411/999

(58) Field of Classification Search ............... 411/352, 411/353, 999, 432, 433, 108, 349
See application file for complete search history.

(56) References Cited

U.S. PATENT DOCUMENTS

| | | | | |
|---|---|---|---|---|
| 2,773,574 A | * | 12/1956 | Able | 192/43.1 |
| 2,831,520 A | * | 4/1958 | Clarke | 411/349 |
| 2,967,557 A | * | 1/1961 | Tait et al. | 411/349 |
| 3,245,450 A | * | 4/1966 | Sauter | 411/349 |
| 3,250,559 A | * | 5/1966 | Sommerfeld | 292/251 |
| 3,346,032 A | | 10/1967 | Gulistan | |
| 3,368,602 A | * | 2/1968 | Boyd | 411/105 |
| 3,564,563 A | | 2/1971 | Trotter et al. | |
| 4,387,497 A | | 6/1983 | Gulistan | |
| 4,863,326 A | | 9/1989 | Vickers | |
| 4,952,107 A | | 8/1990 | Dupree | |
| 5,098,241 A | | 3/1992 | Aldridge et al. | |
| 5,336,028 A | * | 8/1994 | Yamamoto | 411/107 |
| 5,338,139 A | | 8/1994 | Swanstrom | |
| 5,340,258 A | * | 8/1994 | Simon | 411/535 |
| 5,382,124 A | | 1/1995 | Frattarola | |
| 5,611,654 A | | 3/1997 | Frattarola et al. | |
| 5,642,972 A | | 7/1997 | Ellis et al. | |
| 5,851,095 A | | 12/1998 | Ellis et al. | |
| 5,865,582 A | | 2/1999 | Ellis et al. | |
| 5,910,052 A | | 6/1999 | Ellis et al. | |
| 5,941,669 A | | 8/1999 | Aukzemas | |

(Continued)

FOREIGN PATENT DOCUMENTS

GB    2307019 A    5/1997

OTHER PUBLICATIONS

Southco Handbook 2000, Cover, pp. 193-205, 226-228, 240 and 242.

(Continued)

*Primary Examiner*—Katherine Mitchell
(74) *Attorney, Agent, or Firm*—Paul & Paul

(57) ABSTRACT

A telescopic captive fastener has a knob, a ferrule, a spring, and at least one sleeve. The sleeve extends telescopically between the ferrule and the knob.

4 Claims, 5 Drawing Sheets

U.S. PATENT DOCUMENTS

| | | | |
|---|---|---|---|
| 6,033,168 | A | 3/2000 | Creely, III et al. |
| 6,062,791 | A * | 5/2000 | Simon ........................ 411/535 |
| 6,086,480 | A | 7/2000 | Ellis et al. |
| 6,238,155 | B1 | 5/2001 | Aukzemas et al. |
| 6,280,131 | B1 | 8/2001 | Ellis et al. |
| 6,309,158 | B1 * | 10/2001 | Bellinghausen et al. .... 411/353 |
| 6,357,953 | B1 * | 3/2002 | Ballantyne ................... 403/43 |
| 6,468,012 | B2 | 10/2002 | Ellis et al. |
| 6,761,521 | B2 | 7/2004 | McCormack et al. |
| D494,458 | S * | 8/2004 | Aukzemas et al. .......... D8/387 |
| 7,083,371 | B2 * | 8/2006 | McAfee ..................... 411/107 |
| 2003/0113183 | A1 | 6/2003 | McAfee |
| 2004/0165966 | A1 * | 8/2004 | Aukzemas et al. ......... 411/353 |

OTHER PUBLICATIONS

Penn Engineering & Manufacturing Corp., "Type PFHV Panel Fastner Assemblies," one sheet (Danboro, PA), earlier than 2002.

Penn Engineering & Manufacturing Corp., "Type PF30 Low-Profile Panel Fastener Assemblies," one sheet (Danboro, PA), earlier than 2002.

Penn Engineering & Manufacturing Corp., "Type PF50 and PF60 Low-Profile Panel Fastener Assemblies," one sheet (Danboro, PA), earlier than 2002.

Southco Revision Drawing No. 52-N-181 of "Modified No. 52 Press In Style M3 Thread Assembly," one sheet, May 23, 1997.

Captive Fastener Corporation, "Low-Profile Panel Fastener Series LP," p. 55, earlier than 2002.

Search Report under Section 17, GB 0329526.8, dated May 4, 2004.

* cited by examiner

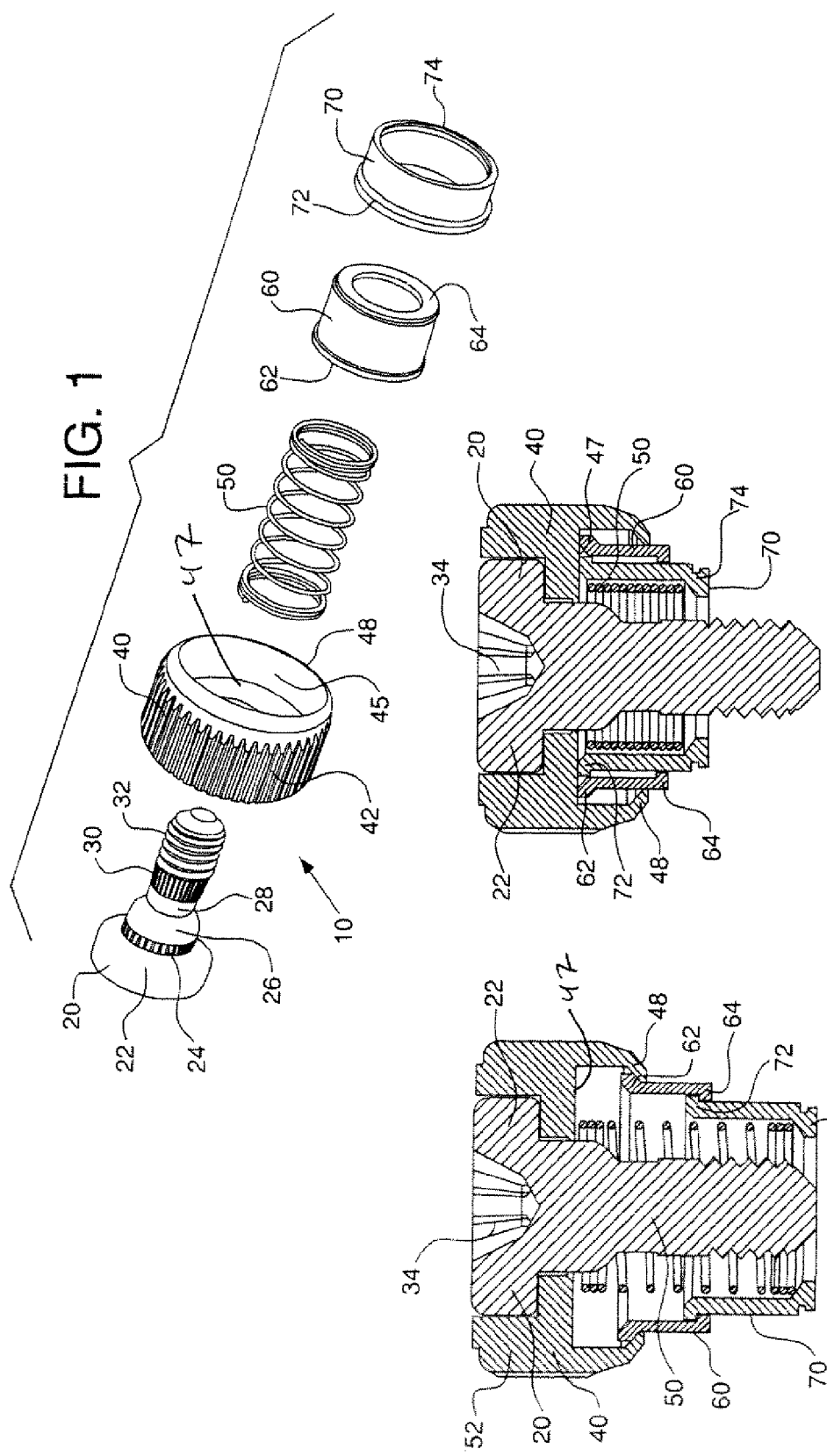

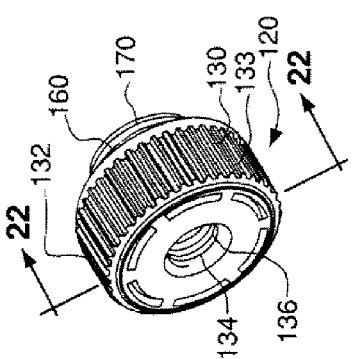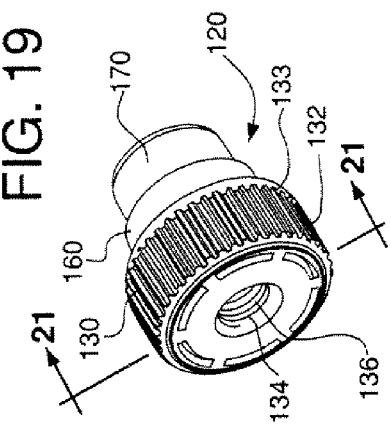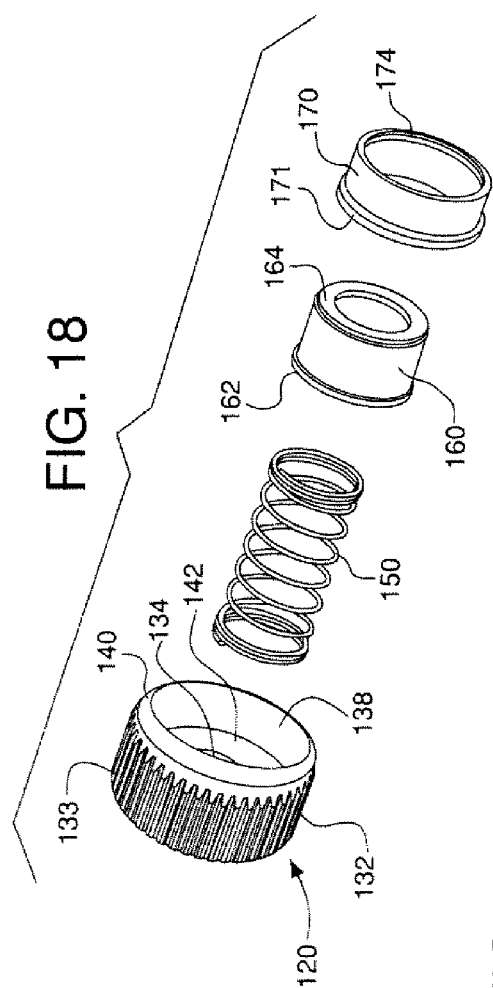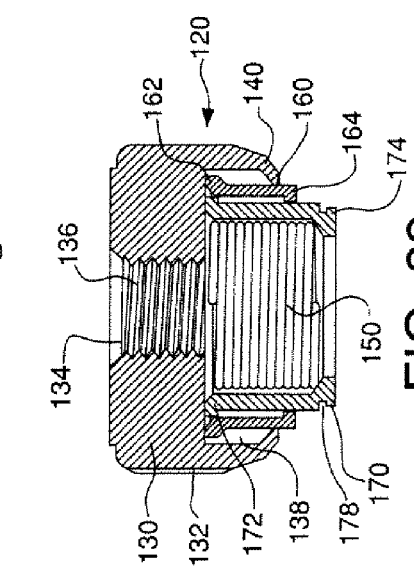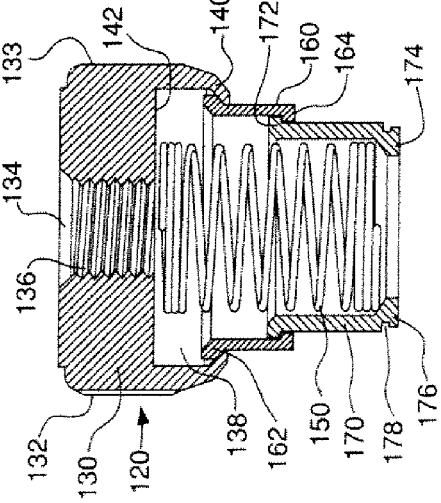

TELESCOPIC CAPTIVE FASTENER

CROSS REFEREENCE TO RELATED APPLICATIONS

This application is a divisional application of Ser. No. 10/738,070 filed Dec. 17, 2003, now U.S Pat. No. 7,179,037 filed Dec. 17, 2003, which claims benefit of provisional application 60/434,497 filed Dec. 18, 2002.

BACKGROUND OF THE INVENTION

1. Field of the Invention

The present invention relates generally to captive fasteners.

2. Brief Description of the Prior Art

Captive screws are fasteners that are "captivated" or held within a collar or ferrule. The ferrule is mounted in a first panel or like object. The screw portion is captivated so that it can be moved perpendicular to the first panel and the screw's threads can engage a corresponding aperture in a second panel, so that the first and second panels can be secured together. However, when the panels are unscrewed and disengage, the screw is retained in the first panel. Captive screws are useful in applications where it is important to avoid dropping or losing screws during assembly or repair, such as electronic devices, where a lost screw can cause catastrophic electrical shorts damaging equipment.

Similarly, although in some applications, a workpiece can be drilled and tapped to receive and secure a screw, in other applications separate nuts are required to secure screws. In some of these applications it is also important to avoid dropping or losing nuts during assembly or repair, in order to avoid possible catastrophic electric shorts damaging equipment. For such applications, nuts can be provided with mounting means so that such nuts can be permanently fixed on a suitable surface. By analogy with the term "captive screws," such nut can be referred to as "captive nuts," and captive screws and captive nuts can be referred to as types of captive fasteners.

Captive screws necessarily stand out above the panel or door in which they are captivated. In certain applications, however, the extension of the captive screw above the panel can have an adverse functional or aesthetic effect. Similarly, in certain applications, the extension of surface-mounted nuts above the mounting surface or panel can also have an adverse functional or aesthetic effect.

In such cases, it would be desirable to reduce the extent to which the captive screw or surface-mounted nut extends above the panel, such as when a captive screw has been engaged by the lower panel or frame that the captive screw is intended to engage. However, at the same time, the captive fastener must be long enough to provide secure fastening between the panels or door and frame. It would be desirable to provide for secure fastening while simultaneously reducing the extent to which the captive fastener extends above the panel in which it is captivated, when the captive fastener is engaged.

SUMMARY OF THE INVENTION

The present invention solves the problem of providing for secure fastening while simultaneously reducing the extent to which the captive screw extends above the panel in which it is captivated, when the captive screw is engaged. The present invention also solves the problem of reducing the extent to which a captive nut extends above the surface on which it is mounted, when the captive nut is engaged. The present invention provides captive fasteners, including both captive screws and captive nuts, that include a telescopic base, having at least one generally cylindrical sleeve positioned in between the ferrule and the knob of the captive fastener.

Advantageously, when a telescopic captive fastener of the present invention is substituted for a conventional captive fastener having the same stroke, the telescopic captive fastener of the present invention has a lower profile than that of the conventional captive fastener, in that a telescopic captive fastener of the present invention does not extend as far above the panel in which it is mounted than the conventional captive fastener. By the same token, when a telescopic captive fastener of the present invention is substituted for a conventional captive fastener having the same extension above the panel in which it is mounted, the telescopic captive faster of the present invention has a greater stroke than the conventional captive fastener. That is, the telescopic captive fastener of the present invention will extend further beneath the panel when in the fully contracted position than the conventional captive fastener.

The present invention provides a telescopic captive fastener including a knob structure, a ferrule, a spring, and at least one sleeve. The telescopic captive fastener includes a knob structure for operating the captive fastener and a ferrule coaxial with the knob structure for attaching the captive fastener to a first structure, as well as a portion for engaging a second structure, the knob structure being axially displaceable with respect to the ferrule from a first position to a second position. A spring is also provided for biasing the knob structure towards the first position. In addition, the telescopic captive fastener includes at least one sleeve, extending telescopically between the ferrule and the knob structure.

The present invention provides a telescopic captive screw including a screw knob, a ferrule, a screw, a spring, and at least one sleeve. The telescopic captive screw includes a screw knob for operating the captive screw and a ferrule coaxial with the knob for attaching the captive screw to a first structure, as well as a screw rotatable with the knob and having a threaded portion for engaging a preformed threaded aperture in a second structure, the screw being axially displaceable with respect to the ferrule from a first position to a second position. A spring is also provided for biasing the screw towards the first position. In addition, the telescopic captive screw includes at least one sleeve, extending telescopically between the ferrule and the screw knob.

The screw preferably has a head, a shank adapted to pass through the ferrule, a threaded portion at the end of the shank opposite the head, and a knurled portion formed on the shank under the head for attaching the screw to the knob.

The screw knob is preferably generally cylindrical and is preferably adapted for receiving the screw head and knurled portion of the shank. The screw knob preferably includes a generally cylindrical, downwardly opening recess having an interior diameter for receiving the sleeve and the spring. The screw knob preferably includes a generally inwardly extending lip formed at the bottom of the screw knob for retaining the at least one sleeve.

The present invention also provides a telescopic captive nut including a nut knob, a ferrule, a spring, and at least one sleeve. The telescopic captive nut includes a nut knob for operating the captive nut, the nut knob having a central aperture with threaded portion for receiving and engaging a preformed threaded shaft such as a screw, and a ferrule coaxial with the knob for attaching the captive nut to a first structure, the nut knob being axially displaceable with respect to the ferrule from a first position to a second position. A spring is also provided for biasing the knob towards the first position. In addition, the telescopic captive nut includes at least one sleeve, extending telescopically between the ferrule and the nut knob.

The nut knob is preferably generally cylindrical and has a central, preferably threaded central aperture for receiving and engaging a threaded shaft such as the shaft of a screw. The nut knob preferably includes a generally cylindrical, downwardly opening recess having an interior diameter for receiving the spring. The nut knob preferably includes a generally inwardly extending lip formed at the bottom of the nut knob for retaining the at least one sleeve.

The at least one sleeve is preferably generally cylindrical. The at least one sleeve preferably has an exterior diameter smaller than the interior diameter of the knob, and has an upper outwardly extending upper lip for cooperating with the inwardly extending lip formed on the bottom of the knob for retaining the sleeve in the knob. The sleeve also preferably includes an inwardly extending lower lip for retaining the ferrule.

The ferrule is preferably generally cylindrical. The ferrule preferably has an exterior diameter smaller than the interior diameter of the at least one sleeve. The ferrule preferably includes an outwardly extending upper lip formed at the upper end of the ferrule for cooperating with the lower lip of the at least one sleeve for retaining the ferrule in the at least one sleeve. The ferrule preferably includes an inwardly extending lower lip formed at the lower end of the ferrule for retaining the spring in the captive screw. Preferably, the ferrule has an annular lip formed on the exterior cylindrical surface proximate the bottom of the ferrule for limiting the penetration of the ferrule in a preformed aperture in the panel or door, as well as an annular circumferential groove formed in the exterior cylindrical surface of the ferrule immediately adjacent and below the annular lip for receiving the plastic flow of material when the ferrule is pressed into the preformed aperture.

BRIEF DESCRIPTION OF THE DRAWINGS

FIG. 1 is an exploded perspective view of a captive screw according to the present invention.

FIG. 4 is a sectional view of the captive screw of FIG. 3 taken along the line 4-4.

FIG. 7 is a sectional view of the captive screw of FIG. 6 taken along the line 7-7.

FIG. 18 is an exploded perspective view of a captive nut according to the present invention.

FIG. 19 is a perspective view of the captive nut of FIG. 18 shown in a fully extended configuration.

FIG. 20 is a perspective view of the captive nut of FIG. 18 shown in a fully retracted configuration.

FIG. 21 is a sectional view of the captive nut of FIG. 19 taken along the line 21-21.

FIG. 22 is a sectional view of the captive nut of FIG. 20 taken along the line 22-22.

DETAILED DESCRIPTION

Figure 5:
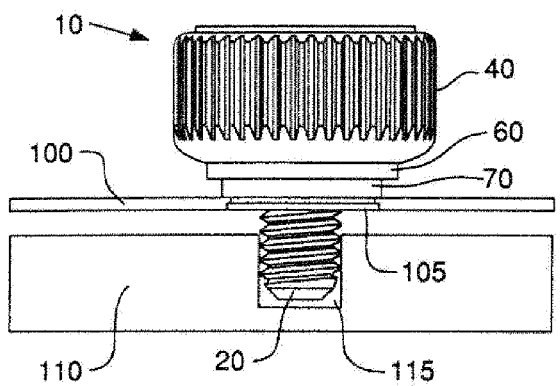
FIG. 5 is a side elevational view of the captive screw of FIG. 1 shown in a fully extended configuration.

The present invention provides a telescopic captive fastener for securing a first structure such as a first panel or door to a second structure such as a second panel or doorframe. Captive fasteners according to the present invention include both captive screws and captive nuts.

Referring now to the drawings in detail, wherein like reference numerals indicate like elements throughout the several views, there is shown in FIG. 1 an exploded perspective view of a telescopic captive screw 10 according to the present invention. The captive screw 10 includes a screw 20, a knob 40, a spring 50, a sleeve 60 and a ferrule 70.

Figure 14:
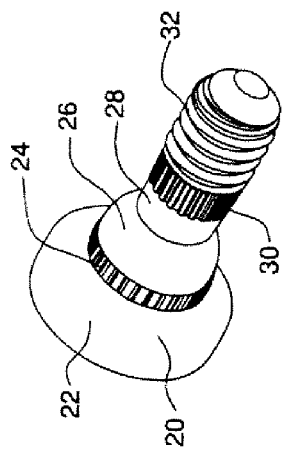
FIG. 14 is a perspective view of the screw of the captive screw of FIG. 1.
Figure 15:
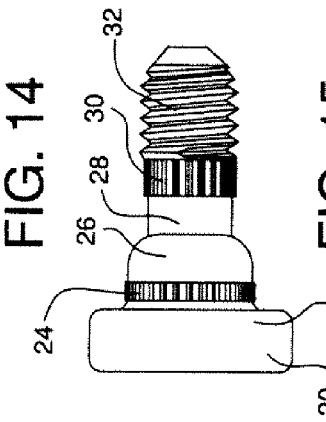
FIG. 15 is a side elevational view of the screw of FIG. 14.
Figure 9:
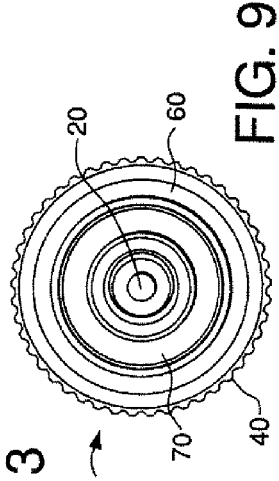
FIG. 9 is a bottom plan view of the captive screw of FIG. 1.
Figure 12:
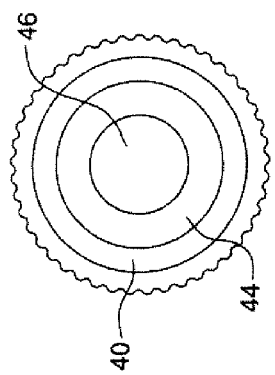
FIG. 12 is a top plan view of the knob of FIG. 10.
Figure 13:
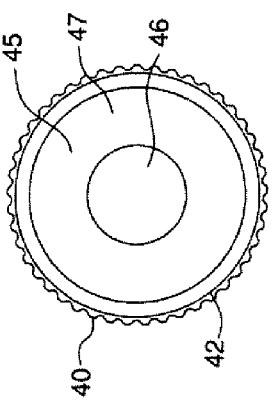
FIG. 13 is a bottom plan view of the knob of FIG. 10.
Figure 8:
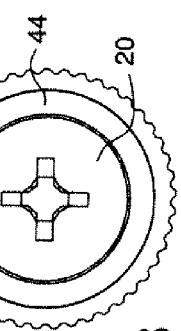
FIG. 8 is a top plan view of the captive screw of FIG. 1.
Figure 10:
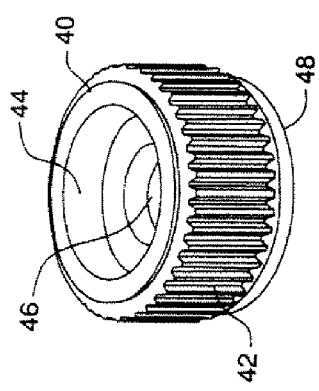
FIG. 10 is a perspective view of the knob of the captive screw of FIG. 1.
Figure 11:
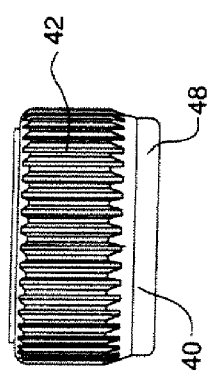
FIG. 11 is a side elevational view of the knob of FIG. 10.

The screw 20, best seen in FIGS. 1, 14 and 15 includes a generally cylindrical head 22 having a central recess 34 formed therein and adapted to receive a driver (best seen in FIGS. 4 and 7). While a Phillip-type driver recess is illustrated, other types of driver recesses, such as slotted, Torx®, hexagonal, and the like, and combinations thereof (e.g. slot-Torx), can also be used. A generally cylindrical upper section 26 extends coaxially downward from the head 22. A portion of the exterior surface of the upper section 26 is knurled, so that when the captive screw 10 is assembled, the upper knurled surface 24 on that portion securely engages an interior surface of the knob 40 (FIGS. 4 and 7), so that the screw 20 and knob 40 are fastened into a single integral upper unit 52. In the alternative, the knob 40 and screw 20 can be formed as a single unit, or the 40 can be secured to the screw 20 in some other manner, such as by staking, or by molding the knob 40 around a preformed screw (not shown). The screw 20 also includes a generally cylindrical shank 28 extending coaxially downwardly from the upper section 26. The shank 28 includes a lower knurled surface 30 and, preferably, a threaded portion 32 formed at the lower end of the shank 28 below the lower knurled surface 30. Alternatively, the lower surface of the shank 28 can be provided with structure for engagement other than thread (not shown). For example, the shank 28 could be provided with one or more circumferencial grooves, slots or pits to be engaged by one or more detent balls positioned in the second structure (not shown). Other mechanical attachment structures can also be employed.

As can be seen in FIGS. 10-13, the generally cylindrical knob 40 has a plurality of knurls 42 formed on its exterior cylindrical surface for grasping the knob 40 in order to operate the captive screw 10. The knurls 42 are an optional feature of the captive fasteners of the present invention, and the generally cylindrical knob 40 can also have smooth exterior cylindrical surface. The knob 40 has a generally cylindrical upper recess 44 formed in the upper portion of the knob 40 for receiving the head 22 of the screw 20, as best seen in the cross-sectional view of FIGS. 4 and 7. The knob 40 also includes a generally cylindrical lower recess 45 formed in the lower portion thereof, and a generally cylindrical aperture 46 communicating between the upper recess 44 and the lower recess 45 for receiving the upper section 26 of the screw 20. The upper recess 44 is bounded by a generally flat upper interior surface 47. In assembling the upper unit 52 of the captive screw 10, the screw 20 is press fit into the knob 40, such that the upper knurled surface 24 of the screw 20 engages the generally cylindrical inner surface of the aperture 46 of the knob 40 to fasten together the screw 20 and the knob 40. An inwardly extending lower lip 48 is formed at the bottom of the knob 40.

The captive screw 10 includes a generally cylindrical tubular sleeve 60 having a outwardly extending upper lip 62 formed at the upper end of the sleeve 60 and an inwardly extending lower lip 64 formed at the lower end of the sleeve 60. As best seen in the cross sectional views of FIGS. 4 and 7, the inwardly extending lower lip 48 of the knob 40 extends under the outwardly extending upper lip 62 of the sleeve 60 so that the sleeve 60 is retained by the knob 40. The lower recess 45 of the knob 40 is sized to permit the sleeve 60 to travel axially within the knob 40 when the captive screw 10 is fastened or unfastened.

The captive screw 10 also includes a generally cylindrical tubular ferrule 70 having an outwardly extending upper lip 72. As best seen in the cross sectional views of FIGS. 4 and 7, the inwardly extending lower lip 64 of the sleeve 60 extends under the outwardly extending upper lip 72 of the ferrule 70 so that the ferrule 70 is retained by the sleeve 60. The generally cylindrical interior of the sleeve 60 is sized to permit the ferrule 70 to travel axially within the sleeve 60 when the captive screw 10 is fastened or unfastened.

The ferrule 70 also includes an inwardly extending lower lip 74 for retaining the spring 50 within the captive screw 10. The spring 50 is preferably a conventional coil spring formed from a suitable grade of spring steel and has a uniform diameter. The diameter of the spring 50 is slightly smaller than the interior diameter of the ferrule 70, so that the inwardly extending lower lip 74 of the ferrule serves to retain the spring 50 within the captive screw 10.

Figure 6:
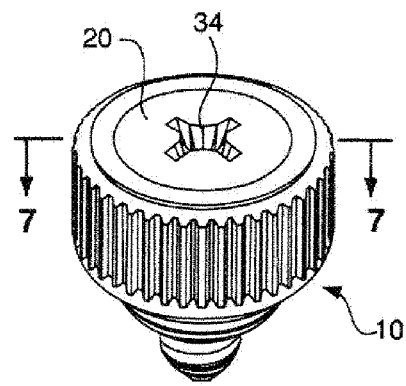
FIG. 6 is a perspective view of the captive screw of FIG. 5.

The ferrule 70 also includes an outwardly extending annular lip 76 formed at the lower end of the ferrule 70 and an annular circumferential groove 78 formed below and proximate the annular lip 76 on the exterior of the ferrule 70 for securing the captive screw 10 in a preformed aperture 105 (FIG. 6) in a first structure 100 such by a press fit. The threaded portion 32 of the screw 20 is intended for securing the captive screw 10 in a preformed, threaded aperture 115 formed in second structure 110 such as a doorframe or panel.

The annular lip 76 or stop formed on the exterior cylindrical surface proximate the bottom of the ferrule 70 limits the penetration of the ferrule 70 in the preformed aperture 105 in the first structure 100, and the annular circumferential groove 78 formed in the exterior cylindrical surface of the ferrule 40 immediately adjacent and below the annular lip 76 receives the plastic flow of material when the ferrule 70 is pressed into the preformed aperture 105.

The captive screw 10 is assembled by placing the spring 50 on the screw 20 of the upper unit 52. The ferrule 70 is placed within the sleeve 60, and the upper unit 52 and spring 50 are placed over the sleeve 60. The lower end of the knob 40 is then forced inwardly by a suitable press and die to form the inwardly extending lip 48 on the knob 40, thereby retaining the sleeve 60.

The generally circular opening in the bottom of the ferrule 70 is large enough to permit the threads 32 of the screw 20 to pass through but not large enough to permit the spring 50 to pass through.

Alternatively, the lip 48 of the knob 40 can be machined, and the central aperture 46 formed in the knob 40 can be greater in diameter than the greatest exterior dimension of the sleeve 60 (not shown), so that the captive screw can be assembled by first passing the partially assemble sleeve 60 and ferrule 70 through the central aperture 46 in the knob 40, and then press fitting the screw 20 bearing the spring 50 into the upper recess 44 in the knob 40 (not shown).

Figure 2:
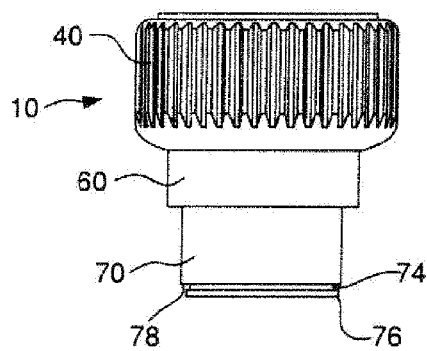
FIG. 2 is a side elevational view of the captive screw of FIG. 1 shown in a fully retracted configuration.
Figure 3:
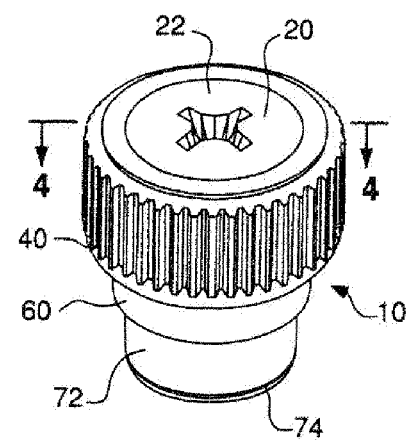
FIG. 3 is a perspective view of the captive screw of FIG. 2.
Figure 16:
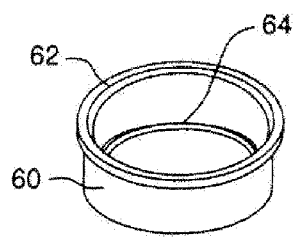
FIG. 16 is a perspective view of the sleeve of the captive screw of FIG. 1.
Figure 17:
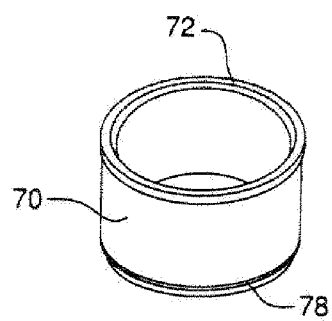
FIG. 17 is a perspective view of the ferrule of the captive screw of FIG. 1.

In the fully extended configuration shown in FIGS. 2, 3 and 4, the force of the spring 50 pushes the upper unit 52 upwards away from the ferrule 70 and the sleeve 60. To operate the captive screw 10, an operator grasps the exterior knurled surface 44 of the knob 40 manually or engages the driver recess 34 formed in the head 22 of the screw 20 with a suitable driver, pushing the upper unit 52 downwards while rotating the upper unit 52 so that the screw threads 32 engage the preformed threaded aperture in the second structure (not shown). As the upper unit 52 is pressed downward, the sleeve 60 enters the lower recess 45 formed in the knob 40, and the knob 40 travels coaxially over the sleeve 60 while the sleeve travels coaxially over the ferrule 70. This telescopic movement continues until both the upper end of the sleeve 60 and the upper end of the ferrule 70 are seated against the upper interior surface 47 of the lower recess 45 of the knob 40, best seen in FIG. 7.

Preferably, the screw 20, knob 40, sleeve 60 and ferrule 70 are formed from a suitable metallic material. In another embodiment, the knob 40 is molded from a suitable synthetic plastic material.

While the ferrule 70 of the present embodiment is adapted to be press fit into the first structure, other means of mounting the captive screw 10 on the structure can be employed, including conventional installation methods known as "flare-in," "floating," "p.c. board," and "snap-in" installation methods.

In addition, to further reduce the vertical extension of the captive screw 10, one or more additional telescopic sleeves (not shown) can be employed.

When a telescopic captive fastener of the present invention is substituted for a conventional captive fastener having the same stroke, the telescopic captive fastener of the present invention has a lower profile than that of the conventional captive fastener, in that a telescopic captive fastener of the present invention does not extend as far above the panel in which it is mounted than the conventional captive fastener. For example, in comparison with a conventional captive screw, such as a Southco no. 47-60-201-24 captive screw, that has an above-panel projection of 15.9 mm in the unfastened, or fully contracted configuration, a telescopic captive faster of the present invention can be assembled having an above panel projection of about 13 mm. Dimensional characteristics of conventional Southco captive screws can be found, for example, in *Southco Handbook* 2003, pp. 208-239.

By the same token, when a telescopic captive fastener of the present invention is substituted for a conventional captive fastener having the same extension above the panel in which it is mounted, the telescopic captive faster of the present invention has a greater stroke than the conventional captive fastener. The telescopic captive fastener of the present invention will extend further beneath the panel when in the fully extended position than the conventional captive fastener. For example, in comparison with a conventional captive screw, such as a Southco no. 47-60-201-24 captive screw, if a telescopic captive fastener of the present invention having the same extension above the panel as the conventional captive screw is substituted for the conventional captive screw, the projection of the telescopic captive screw below the panel in the fully extended configuration can be as much as 3 mm greater than the conventional captive screw. In the case of a telescopic captive screw prepared to replace Southco no 47-60-201-24, a 3 mm increase in projection is over a 50 percent increase.

The present invention also provides captive nuts. FIG. 18 shows an exploded perspective view of a telescopic captive nut 120 according to the present invention. The captive nut 120 includes a nut knob or nut 130, a spring 150, a sleeve 160 and a ferrule 170.

As can be seen in FIGS. 18, 21 and 22, the generally cylindrical nut knob 130 has a plurality of knurls 132 formed on its exterior cylindrical surface 133 for grasping the knob 130 in order to operate the captive nut 120. The knob 130 has a generally cylindrical central aperture 134 formed in the upper portion of the knob 130 for receiving the shaft of screw, threaded rod, or like "male" fastener (not shown). The central aperture 134 preferably has a plurality of female threads 136 formed on its surface, as best seen in the cross-sectional view of FIGS. 21 and 22, for engaging corresponding male threads formed on the fastener (not shown). Other attachment structures can also be employed. For example, the central aperture 134 could include one or more circumferential grooves (not shown) for engaging corresponding detent balls positioned on a shaft extending from the second structure (not shown) for locking the knob 130 to the shaft. The knob 130 also includes a generally cylindrical recess 138 formed in the lower portion thereof for receiving the upper end of a spring 150. An inwardly extending lower lip 140 is formed at the bottom of the knob 130.

The captive nut 120 also includes a generally cylindrical tubular sleeve 160 having a outwardly extending upper lip 162 formed at the upper end of the sleeve 160 and an inwardly extending lower lip 164 formed at the lower end of the sleeve 160. As best seen in the cross sectional views of FIGS. 21 and 22, the inwardly extending lower lip 140 of the knob 130 extends under the outwardly extending upper lip 162 of the sleeve 160 so that the sleeve 160 is retained by the knob 130. The recess 138 of the knob 130 is sized to permit the sleeve 160 to travel axially within the knob 130 when the captive nut 130 is fastened or unfastened.

The captive nut 130 also includes a generally cylindrical tubular ferrule 170 having an outwardly extending upper lip 172. As best seen in the cross sectional views of FIGS. 21 and 22, the inwardly extending lower lip 164 of the sleeve 160 extends under the outwardly extending upper lip 172 of the ferrule 170 so that the ferrule 170 is retained by the sleeve 160. The generally cylindrical interior of the sleeve 160 is sized to permit the ferrule 170 to travel axially within the sleeve 160 when the captive nut 130 is fastened or unfastened.

The ferrule 170 also includes an inwardly extending lower lip 174 for retaining the spring 150 within the captive nut 10. The spring 150 is preferably a conventional coil spring formed from a suitable grade of spring steel and has a uniform diameter. The diameter of the spring 150 is slightly smaller than the interior diameter of the ferrule 170, so that the inwardly extending lower lip 174 of the ferrule serves to retain the spring 150 within the captive 130.

The ferrule 170 also includes an outwardly extending annular lip 176 formed at the lower end of the ferrule 170 and an annular circumferential groove 178 formed below and proximate the annular lip 176 on the exterior of the ferrule 170 for securing the captive nut 130 in a preformed aperture (not shown) in a first structure such by a press fit.

The annular lip 176 or stop formed on the exterior cylindrical surface proximate the bottom of the ferrule 170 limits the penetration of the ferrule 170 in the preformed aperture, and the annular circumferential groove 178 formed in the exterior cylindrical surface of the ferrule 170 immediately adjacent and below the annular lip 176 receives the plastic flow of material when the ferrule 170 is pressed into the preformed aperture.

The captive nut 120 is assembled by placing the spring 150 within the recess 138 of the nut knob 130. The ferrule 170 is placed within the sleeve 160, and the nut knob 130 and spring 150 are placed over the sleeve 160. The lower end of the nut knob 130 is then forced inwardly by a suitable press and die to form the inwardly extending lip 140 on the nut knob 130, thereby retaining the sleeve 160.

The generally circular opening in the bottom of the ferrule 70 is large enough to permit the shaft of a fastening device (not shown) to pass through but not large enough to permit the spring 150 to pass through.

Figure 23:
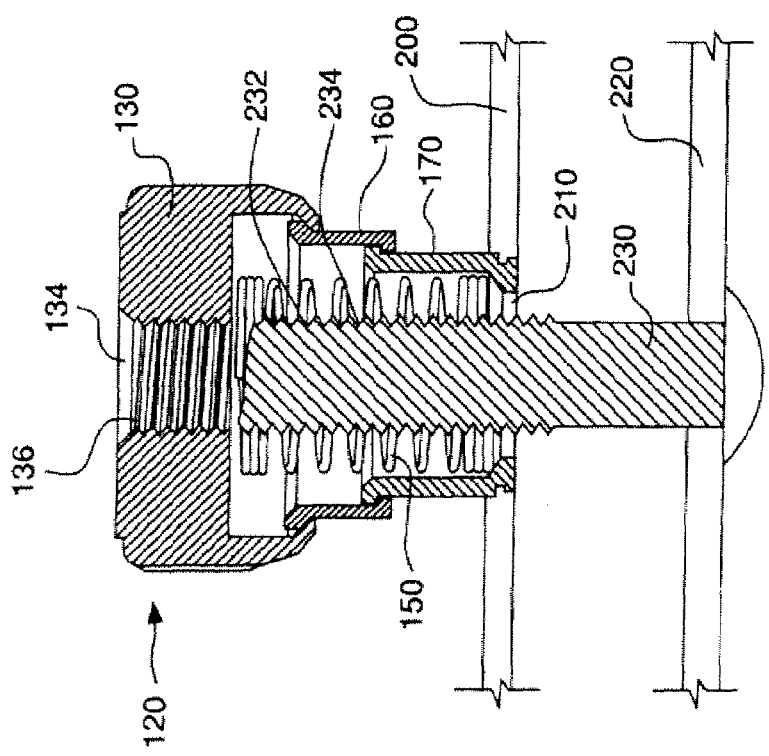
FIG. 23 is a section view of the captive nut of FIG. 18 shown mounted on a first structure for engaging a second structure, the captive nut being shown in the fully extended position.

In the fully extended configuration shown in FIGS. 19, 21 and 23, the force of the spring 150 pushes the nut knob 130 upwards away from the ferrule 170 and the sleeve 160.

Figure 24:
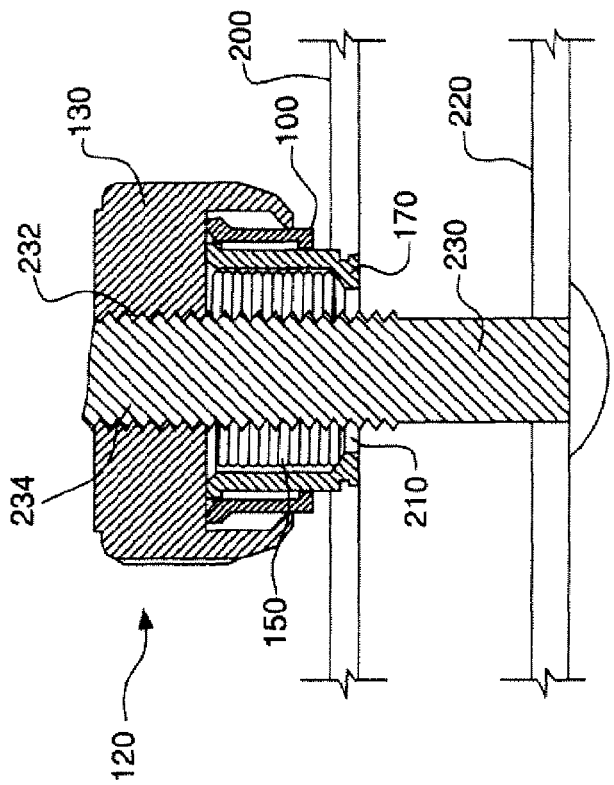
FIG. 24 is a sectional view of the captive nut of FIG. 23 shown in the fully contracted position and engaging a screw post extending from the second structure, so as to fasten the first structure to the second structure.

As best seen in the sectional views of FIGS. 23 and 24, the captive nut 120 can be mounted in an aperture 210 formed in a first structure or panel 200, as by press-mounting. A second structure or panel 220 which is to be fastened to the first panel 200 includes an upstanding generally cylindrical shaft or post 230 having male threads 232 formed on the exterior surface 234 thereof. To secure the second structure 220 to the first structure 200, the upstanding shaft 230 in the second structure 220 is first aligned with the aperture 210 formed in the first structure 200, and the first structure 200 and second structure 220 are moved together so that the shaft 220 passes through the aperture 210 formed in the first structure, and the captive nut 120 is then secured to the shaft 230. To operate the captive nut 120, an operator grasps the knurled surface 133 of the knob 130 manually, pushing the nut knob 130 downwards while rotating the nut knob 130 so that the female screw threads 136 engage the preformed male threads of the shaft 220. As the nut 130 is pressed downward, the sleeve 160 enters the recess 138 formed in the knob 130, and the knob 130 travels coaxially over the sleeve 160 while the sleeve 160 travels coaxially over the ferrule 170. This telescopic movement continues until both the upper end of the sleeve 160 and the upper end of the ferrule 170 are seated against the upper interior surface 142 of the recess 45 of the knob 130, best seen in FIGS. 22 and 24.

Preferably, the knob 130, sleeve 160 and ferrule 170 are formed from a suitable metallic material. In another embodiment, the knob 130 is molded from a suitable synthetic plastic material.

While the ferrule 170 of the present embodiment is adapted to be press fit into the first structure, other means of mounting the captive nut 120 on the structure can be employed, including conventional installation methods known as "flare-in," "floating," "p.c. board," and "snap-in" installation methods.

In addition, to further reduce the vertical extension of the captive nut 120, one or more additional telescopic sleeves (not shown) can be employed.

Various other modifications can be made in the details of the various embodiments of the apparatus of the present invention, all within the scope and spirit of the invention and defined by the appended claims.

We claim:

1. A telescopic captive nut including:
   a knob for operating the captive nut,
   a ferrule coaxial with the knob for attaching the captive nut to a first structure,
   the knob having a central aperture, the central aperture having threads for engaging corresponding threads formed on a second structure, the first knob being axially displaceable with respect to the ferrule from a first position to a second position;
   a spring directly contacting the knob and biasing the knob towards the first position,
   and at least one sleeve, extending telescopically between the ferrule and the knob, the at least one sleeve having an inner diameter.

2. A captive nut according to claim 1 wherein the knob includes a generally cylindrical, downwardly opening recess having an interior diameter for receiving the at least one sleeve, ferrule and the spring, and a generally inwardly extending lip formed at the bottom of the knob for retaining the at least one sleeve.

3. A captive nut according to claim 1 wherein the at least one sleeve has an exterior diameter smaller than the interior diameter of the recess of the knob, an upper outwardly extending upper lip for cooperating with the inwardly extending lip formed on the bottom of the knob for retaining the at least one sleeve in the knob, and an inwardly extending lower lip for retaining the ferrule.

4. A captive nut according to claim 1 wherein the ferrule is generally cylindrical, having an exterior diameter smaller than the inner diameter of the at least one sleeve, and includes an outwardly extending upper lip formed at the upper end of the ferrule for cooperating with the lower lip of the at least one sleeve for retaining the ferrule in the at least one sleeve, and an inwardly extending lower lip formed at the lower end of the ferrule for retaining the spring in the captive nut.

* * * * *